Patented Dec. 1, 1931

1,834,788

UNITED STATES PATENT OFFICE

EINAR LANGFELDT, OF OSLO, NORWAY

PROCESS FOR THE PRODUCTION OF A SUGAR SOLUTION

No Drawing. Application filed August 7, 1928, Serial No. 298,131, and in Norway June 9, 1928.

This invention has for its object a process for the manufacture of yeast as well as for other purposes.

According to the invention there is employed as an initial material for the production of the sugar solution a product obtained from roots rich in starch, particularly the roots of the Manihot plant (*Manihot utilissima, Manihot aipi, Manihot janipka*), by removing a substantial proportion of the water-soluble constituents of the roots and thereupon drying the same. This product is subjected to saccharification, not by diastatic action, but by heating with acids.

By this process it is possible to obtain a solution very rich in sugar, and if desirable there can be produced directly from the prepared and dried roots, without any evaporation operation subsequent to the saccharification treatment, solutions containing between 30 and 50 per cent of sugar. After having been diluted, this solution is particularly suitable as a nutritive liquid for yeast in the manufacture of yeast or in the fermentation industries generally. When used in the yeast manufacture, it may be advisable to add some ammonium salts before or during use.

The addition of ammonium salts can be dispensed with, however, if the neutralization of acid taking place after the saccharification operation is effected entirely or in part by means of ammonia.

Owing to its high percentage of sugar and to the readiness with which complete saccharification is obtained, this sugar solution can with great advantage be employed to produce commercial glucose as well as for the manufacture of alcohol.

According to the invention the material which is to be saccharified is obtained by subjecting roots of the specified character to a treatment whereby a substantial proportion of the substances contained in the juice of the roots is removed, and then drying the material. The removal of the said dissolved substances is effected by washing or pressing the subdivided roots or by a suitable combination of washing and pressing operations. When the roots employed as a raw material are the bitter roots of *Manihot utilissima*, the best results have been obtained by washing the disintegrated roots with water, then pressing the washed material and finally drying same. The drying is carried so far as to obtain a preserving product.

It has been found that the material obtained from the roots by the described treatment is rapidly and with surprisingly great readiness saccharified by heating with acids (for example, sulphuric acid, hydrochloric acid, oxalic acid, phosphoric acid etc.) under atmospheric pressure as well as in autoclaves. The reason for this ability of ready, rapid and complete saccharification has not as yet been ascertained, but it is probably due to the special preparatory treatment as well as to its composition (it is low in proteins) and perhaps also to the presence of substances promoting the hydrolysis of starch.

*Example*

1 kilogram of a coarsely pulverulent product, obtained from roots of the Manihot plant in the manner above described and containing about 80 per cent dry substance (20% moisture) was mixed with 4 litres of sulphuric acid of 3.5 per cent strength and the mixture heated to 125° C. for two hours.

The saccharification was then complete. The solution was thereupon neutralized with lime and filtered.

The resulting solution is suitable for the manufacture of commercial glucose, and after dilution it can be directly employed in the manufacture of yeast or in other related industries, for example, the production of alcohol.

Instead of sulphuric acid, other acids, for example hydrochloric acid, can also be used to effect the saccharification.

When the sugar solution is to be employed in the manufacture of compressed yeast, the neutralization is suitably brought about entirely or in part by means of ammonia, whereby a portion or the entire quantity of the nitrogen required for the nutrition of the yeast is supplied.

I claim as my invention:

Process for the manufacture of yeast and alcohol, in which a substantially dry material containing the entire starch, cellulose and other solid constituents of Manihot roots with the exception of a substantial proportion of the dissolved constituents of the root juice is subjected to saccharification by heating with dilute acid.

In testimony whereof I have signed my name unto this specification.

EINAR LANGFELDT.